United States Patent
Maeda et al.

(10) Patent No.: US 11,351,619 B2
(45) Date of Patent: Jun. 7, 2022

(54) BALL END MILL

(71) Applicant: MOLDINO Tool Engineering, Ltd., Tokyo (JP)

(72) Inventors: Katsutoshi Maeda, Yasu (JP); Mitsuhiro Yokokawa, Yasu (JP)

(73) Assignee: MOLDINO Tool Engineering, Ltd., Tokyo (JP)

( * ) Notice: Subject to any disclaimer, the term of this patent is extended or adjusted under 35 U.S.C. 154(b) by 181 days.

(21) Appl. No.: 16/486,514

(22) PCT Filed: Feb. 19, 2018

(86) PCT No.: PCT/JP2018/005706
§ 371 (c)(1),
(2) Date: Aug. 16, 2019

(87) PCT Pub. No.: WO2018/168341
PCT Pub. Date: Sep. 20, 2018

(65) Prior Publication Data
US 2020/0047263 A1  Feb. 13, 2020

(30) Foreign Application Priority Data

Mar. 13, 2017 (JP) .............................. JP2017-047579

(51) Int. Cl.
*B23C 5/10* (2006.01)

(52) U.S. Cl.
CPC ...... *B23C 5/1009* (2013.01); *B23C 2210/205* (2013.01); *B23C 2210/28* (2013.01)

(58) Field of Classification Search
CPC ... B23C 5/1009; B23C 5/1018; B23C 5/1027; B23C 2210/205; B23C 2210/202; B23C 2210/209; B23C 2210/28; B23C 2210/54
See application file for complete search history.

(56) References Cited

U.S. PATENT DOCUMENTS

2010/0196108 A1* 8/2010 Oka .......................... B23C 5/10
407/54
2012/0170984 A1 7/2012 Azegami
(Continued)

FOREIGN PATENT DOCUMENTS

CN 105377488 A 3/2016
DE 102005043841 A1 * 3/2007 ........... B23C 5/1009
(Continued)

OTHER PUBLICATIONS

Description DE102005043841A1 (translation) obtained at https://worldwide.espacenet.com/ (last visited Jul. 30, 2021).*
(Continued)

*Primary Examiner* — Ryan Rufo
(74) *Attorney, Agent, or Firm* — Locke Lord LLP

(57) ABSTRACT

A ball end mill according to the present invention includes an end mill body which is formed in a shaft shape, a plurality of convex arcuate end cutting edges which are disposed on a tip portion of the end mill body at intervals around an axis and form a hemispherical shape such that a rotational locus around the axis has a center on the axis, and a plurality of gashes which are respectively disposed to be adjacent to the plurality of end cutting edges in an end mill rotation direction around the axis. The plurality of end cutting edges includes a first end cutting edge longest among the plurality of end cutting edges, a second end cutting edge which is adjacent to the first end cutting edge in the end mill rotation direction and a third end cutting edge which is adjacent to the second end cutting edge in the end mill rotation direction.

4 Claims, 4 Drawing Sheets

(56) References Cited

U.S. PATENT DOCUMENTS

| | | | | |
|---|---|---|---|---|
| 2013/0108382 | A1* | 5/2013 | Haraguchi | B23C 5/10 407/54 |
| 2014/0294528 | A1* | 10/2014 | Azegami | B23C 5/10 408/200 |
| 2015/0037105 | A1 | 2/2015 | Fukata et al. | |
| 2015/0266113 | A1* | 9/2015 | Fukata | B23C 5/28 407/11 |
| 2016/0052072 | A1* | 2/2016 | Davis | B23C 5/10 409/131 |
| 2016/0074947 | A1* | 3/2016 | Shpigelman | B23C 5/10 407/54 |
| 2016/0303664 | A1* | 10/2016 | Azegami | B23C 5/1009 |

FOREIGN PATENT DOCUMENTS

| | | | |
|---|---|---|---|
| JP | 06-155130 | A | 6/1994 |
| JP | 07-040021 | U | 7/1995 |
| JP | 09-267211 | A | 10/1997 |
| JP | H10-080816 | A | 3/1998 |
| JP | H10-151511 | A | 6/1998 |
| JP | 11-090721 | A | 4/1999 |
| JP | 2003-019619 | A | 1/2003 |
| JP | 2003-039223 | A | 2/2003 |
| JP | 2004141975 | A * | 5/2004 |
| JP | 2004-276142 | A | 10/2004 |
| JP | 2004276142 | A * | 10/2004 |
| JP | 2005125465 | A * | 5/2005 |
| JP | 2006-000985 | A | 1/2006 |
| JP | 2006000985 | A * | 1/2006 |
| JP | 2011-056649 | A | 3/2011 |
| JP | 2011-167781 | A | 9/2011 |
| JP | 2011-183532 | A | 9/2011 |
| JP | 2012-200836 | A | 10/2012 |
| JP | 2013-166201 | A | 8/2013 |
| JP | 2013-202771 | A | 10/2013 |
| JP | 2014-195863 | A | 10/2014 |
| JP | 2015-047655 | A | 3/2015 |
| JP | 2015-171762 | A | 10/2015 |
| JP | 2015-188973 | A | 11/2015 |
| JP | 2016-112663 | A | 6/2016 |
| KR | 10-1428772 | B1 | 8/2014 |
| KR | 10-2016-0039286 | A | 4/2016 |

OTHER PUBLICATIONS

Notice of Allowance dated Sep. 1, 2020, issued for Korean Patent Application No. 10-2019-7020854 and English translation thereof.
International Search Report dated Apr. 17, 2018, issued for PCT/JP2018/005706 and English translation thereof.
International Preliminary Report on Patentability dated Jan. 15, 2019, issued for PCT/JP2018/005706 and English translation thereof.
Office Action dated Mar. 30, 2020, issued for Chinese Patent Application No. 201880008399.4 and English translation thereof.
Office Action dated Dec. 15, 2020, issued for Japanese Patent Application No. 2019-505801 and English translation thereof.
Japanese Office Action—Decision of Dismissal of Amendmentwith dated Aug. 10, 2021 for JP Application No. 2019-505801, 8 pages.
Notice of Allowance dated Jan. 11, 2022, issued for Japanese Patent Application No. 2019-505801 and English translation thereof.

* cited by examiner

BALL END MILL

TECHNICAL FIELD

The present invention relates to a ball end mill.

Priority is claimed on Japanese Patent Application No. 2017-047579, filed on Mar. 13, 2017, the content of which is incorporated herein by reference.

BACKGROUND ART

In the related art, for example, a ball end mill as described in Patent Document 1 below is known.

The ball end mill has an end mill body which is formed in a shaft shape. A cutting portion is formed at a tip portion in an axial direction of the end mill body, and a portion of the end mill body other than the cutting portion becomes a shank portion. In addition, in the cutting portion, a plurality of chip discharge grooves, gashes, peripheral cutting edges and end cutting edges (tip cutting edges) are respectively formed.

In the plurality of end cutting edges of the ball end mill, at least one end cutting edge becomes a long cutting edge in which a tip in a cutting edge length direction extends to near an axis. A rotational locus of the plurality of end cutting edge around the axis forms a hemispherical shape having a center on the axis. At the time of cutting, the ball end mill is fed in a direction intersecting the axis while rotating around the axis of the end mill body in an end mill rotation direction, and thus, cuts into a workpiece.

CITATION LIST

Patent Literature

[Patent Document 1] Japanese Unexamined Patent Application, First Publication No. 2003-39223

SUMMARY OF INVENTION

Technical Problem

However, the ball end mill of the related art has the following problems.

Chips generated by cutting with end cutting edges are discharged through gashes disposed to be adjacent to the end cutting edges in an end mill rotation direction. However, chip clogging may occur in the gashes.

Particularly, in a case of a ball end mill having multiple cutting edges such as six or more cutting edges, as the number of end cutting edges increases, a volume of each gash decrease, and thus, the chip is easily clogged in the gash. If the chip clogging occurs, it is difficult to favorably maintain machining surface accuracy of a workpiece.

The present invention is made in consideration of the above-described circumstances, and an object thereof is to provide a ball end mill capable of stably enhancing chip discharging properties of the gash and improving machining surface accuracy.

Solution to Problem (1) According to an aspect of the present invention, there is provided a ball end mill including: an end mill body which is formed in a shaft shape; a plurality of convex arcuate end cutting edges which are disposed on a tip portion of the end mill body at intervals around an axis and form a hemispherical shape such that a rotational locus around the axis has a center on the axis; and a plurality of gashes which are respectively disposed to be adjacent to the plurality of end cutting edges in an end mill rotation direction around the axis, in which the plurality of end cutting edges includes a first end cutting edge of which the cutting edge length toward an inside in a radial direction orthogonal to the axis is longest among the plurality of end cutting edges, a second end cutting edge which is adjacent to the first end cutting edge in the end mill rotation direction and of which the cutting edge length toward the inside in the radial direction is shorter than that of the first end cutting edge, and a third end cutting edge which is adjacent to the second end cutting edge in the end mill rotation direction and of which the cutting edge length toward the inside in the radial direction is shorter than that of the second end cutting edge, the depth of a gash of the second end cutting edge is deeper than that of a gash of the third end cutting edge, and a depth of a gash of the first end cutting edge is deeper than that of the gash of the second end cutting edge, the plurality of peripheral cutting edges which are disposed on an outer periphery of the end mill body at intervals around the axis, are respectively connected to radially outer end edges of the end cutting edges, and extend from the end edges toward a posterior end side of the end mill body, in a front view of the end mill body, the first end cutting edge extends from a connection portion between the peripheral cutting edge and the first end cutting edge toward the inside in the radial direction and a tip of the first end cutting edge in a cutting edge length is disposed at a position beyond the axis, in the front view of the end mill body, the second end cutting edge extends from a connection portion between the peripheral cutting edge and the second end cutting edge toward the inside in the radial direction and a tip of the second end cutting edge in a cutting edge length is disposed at a position which does not exceed the axis, in the front view of the end mill body, the third end cutting edge extends from a connection portion between the peripheral cutting edge and the third end cutting edge toward the inside in the radial direction and a tip of the third end cutting edge in a cutting edge length is disposed at a position which does not exceed the axis O, and the tip of the third end cutting edge is disposed an outside in the radial direction than the tip of the second end cutting edge.

The ball end mill of the present invention includes the first end cutting edge, the second end cutting edge, and the third end cutting edge, as the plurality of end cutting edges whose rotational loci around the axis form a hemispherical shape. The cutting edge lengths of the first end cutting edge, the second end cutting edge, and the third end cutting edge toward the inside in the radial direction are shortened in this order. That is, in the first to third end cutting edges, the cutting edge length of the first end cutting edge is longest and the cutting edge length of the third end cutting edge is shortest.

The cutting edge length of the first end cutting edge is longest, the cutting edge length of the third end cutting edge is shortest, and thus, the gash can be also formed near a center portion (near the axis) of an end mill tip surface, and it is possible to enhance chip discharging properties. In addition, amounts of cutting of the respective end cutting edges are different from each other, and thus, chatter vibrations during the cutting tend to be suppressed.

In addition, in the end cutting edges, the gashes are respectively disposed to be adjacent to the end cutting edges in the end mill rotation direction. The radially inward gash lengths of the gashes correspond to the cutting edge lengths of the end cutting edges adjacent to the gashes. Accordingly, the gash lengths of the gash of the first end cutting edge, the gash of the second end cutting edge, and the gash of the third end cutting edge are shortened in this order. That is, in the gashes of the first to third end cutting edges, the length of the gash of the first end cutting edge is longest and the length of the gash of the third end cutting edge is shortest.

In addition, as the cutting edge length of the end cutting edge becomes longer, the amount of cutting per one cut (unit cut) increases, and thus, it is more difficult to secure the chip discharging properties. That is, it is more difficult to secure the chip discharging properties as the length of the gas becomes longer.

Accordingly, the present embodiment adopts a specific configuration in which the depth of the gash of the second end cutting edge is deeper than that of the gash of the third end cutting edge, and the depth of the gash of the first end cutting edge is deeper than that of the gash of the second end cutting edge.

That is, the gash of the third end cutting edge, the gash of the second end cutting edge, and the gash of the first end cutting edge are made deeper in this order. Accordingly, in the first to third end cutting edges, a volume (cross-sectional area) of the gash increases as the cutting edge length becomes longer. In other words, as the amount of cutting of the end cutting edge increases, the secured gash volume can increase. In addition, it is possible to stably enhance the chip discharging properties.

Moreover, the "depth of the gash" indicates a distance between a hemispheric rotational locus (an imaginary hemispherical surface) obtained by rotating the end cutting edge around the axis and a portion (a deepest portion of the gash) of a bottom surface of the gash positioned farthest from the rotational locus.

Moreover specifically, the end cutting edge extends along the imaginary hemispherical surface having a center point on the axis. In addition, for the imaginary hemispheric surface, the "depth of the gash" is a distance along the radiation direction between a portion of the bottom surface of the gash positioned on an innermost side in the radiation direction centered on the center point and the imaginary hemispherical surface.

As described above, according to the ball end mill of the present invention, it is possible to enhance the chip discharging properties of the gash, and it is possible to prevent chip clogging to improve machining surface accuracy.

Further, the tip of the first end cutting edge in the cutting edge length direction extending from the connection portion between the peripheral cutting edge and the first end cutting edge toward the inside in the radial direction is disposed at the position beyond the axis, and thus, it is possible to cut the workpiece by the first end cutting edge even at the most tip position (that is, on the axis) of the end mill body in the axial direction. Therefore, it is possible to easily cope with various types or shapes of cutting while enhancing the machining surface accuracy.

(2) In the ball end mill, preferably, two sets of the first end cutting edges, the second end cutting edges, and the third end cutting edges are provided in 180° rotational symmetry centered on the axis.

In this case, the ball end mill having six end cutting edges is realized, and it is possible to enhance the machining efficiency of cutting. In addition, in the ball end mill having multiple cutting edges, according to the present invention, the chip discharging properties are stably secured.

(3) In the ball end mill, preferably, the gash of the first end cutting edge, the gash of the second end cutting edge, and the gash of the third end cutting edge communicate with each other.

In this case, the respective gashes of the first to third end cutting edges communicate with each other, and thus, the above-described effects of stably enhancing the chip discharging properties are more remarkable.

(5) In the ball end mill, preferably, the plurality of peripheral cutting edges are disposed at equal pitches around the axis.

In this case, the plurality of peripheral cutting edges are disposed at equal pitches, and thus, when the ball end mill is manufactured, the peripheral cutting edges are easily formed, and easiness of manufacturing is enhanced.

(6) In the ball end mill, preferably, the end cutting edge extends along an imaginary hemispherical surface having a center point on the axis, in which in a reference plane including a predetermined point on the end cutting edge and the axis, when an angle at which an imaginary straight line passing through the center point and the predetermined point is inclined with respect to the axis is defined as a radiation angle, in a predetermined radiation angle, among rotational loci around the axis of the first end cutting edge, the second end cutting edge, and the third end cutting edge, a distance along in a radiation direction between a rotational locus positioned on an outermost side and a rotational locus positioned on an innermost side in the radiation direction centered on the center point is 5 μm or less.

In this case, the deflection of the end cutting edge at the predetermined radiation angle is controlled to 5 μm or less, and thus, even when a single-edge feed amount is small, each end cutting edge can exert the same function, and thus, it is possible to achieve favorable machining surface accuracy.

(7) In the ball end mill, preferably, the predetermined radiation angle is 40° to 50°.

The end cutting edge in which the predetermined radiation angle is within a range of 40° to 50° tends to be particularly frequently used, and thus, it is possible to further enhance the machining surface accuracy by suppressing the deflection of each end cutting edge in this range.

Advantageous Effects of Invention

According to the ball end mill of the present invention, it is possible to stably enhance chip discharging properties of a gash, and it is possible to improve machining surface accuracy.

DESCRIPTION OF EMBODIMENTS

Hereinafter, a ball end mill 1 according to an embodiment of the present invention will be described with reference to the drawings.

For example, the ball end mill 1 of the present embodiment is a cutting tool (milling tool) which performs cutting (milling) such as finishing or semi-finishing on a workpiece of a metal material or the like.

Figure 1:
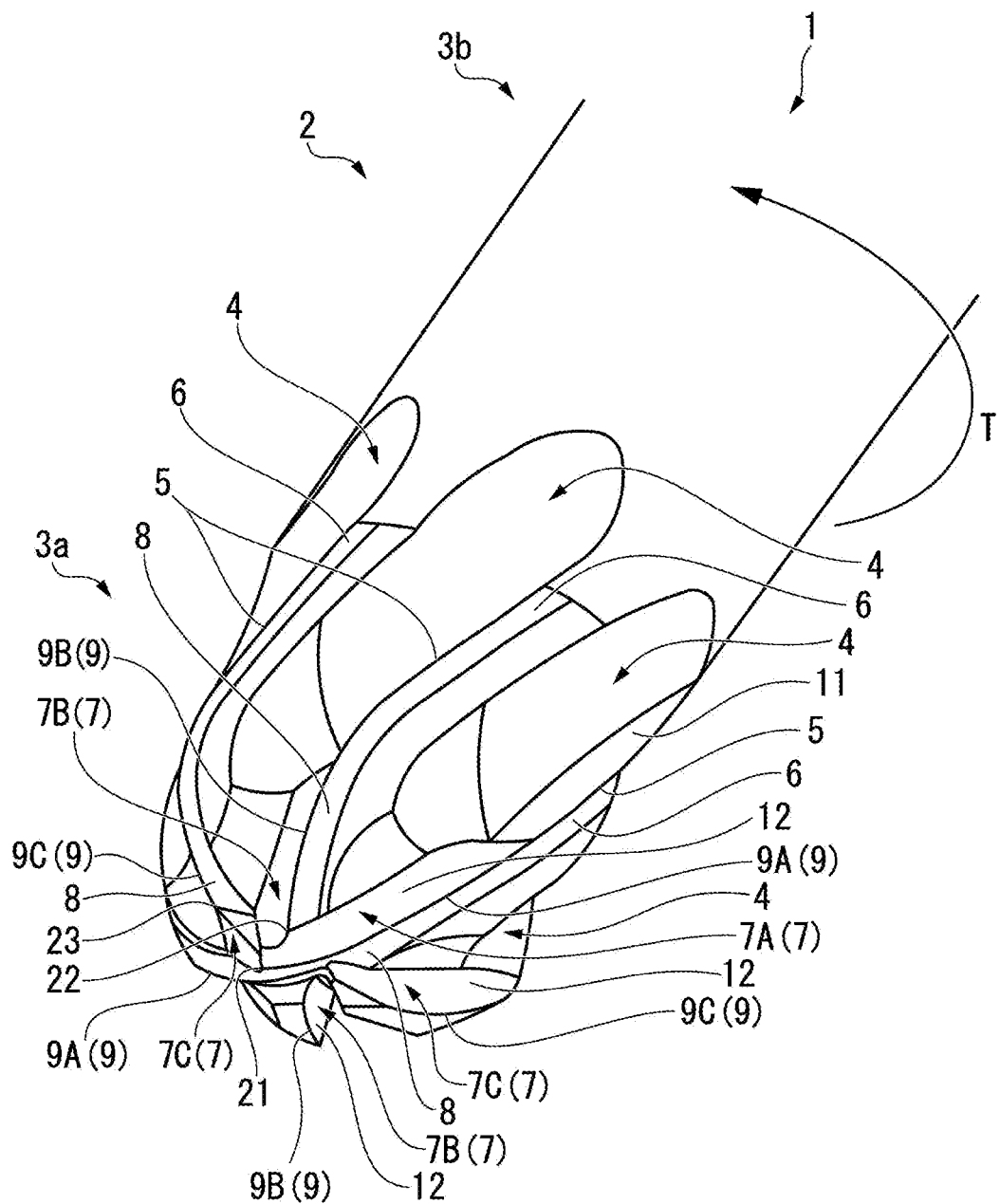
FIG. 1 is a perspective view showing a main portion (cutting portion) of a ball end mill according to an embodiment of the present invention.
Figure 2:
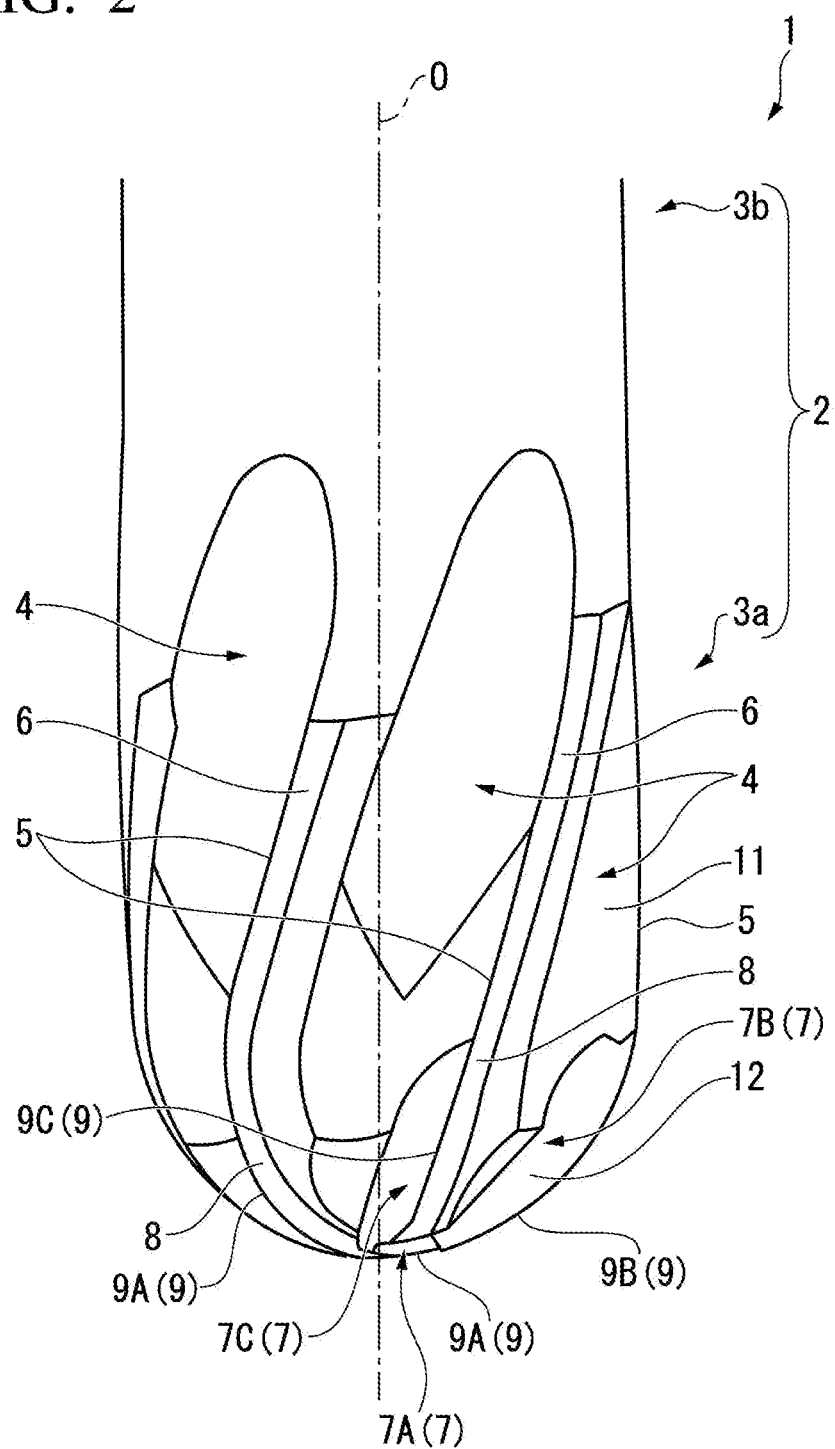
FIG. 2 is a side view (plan view) of the ball end mill of FIG. 1.
Figure 3:
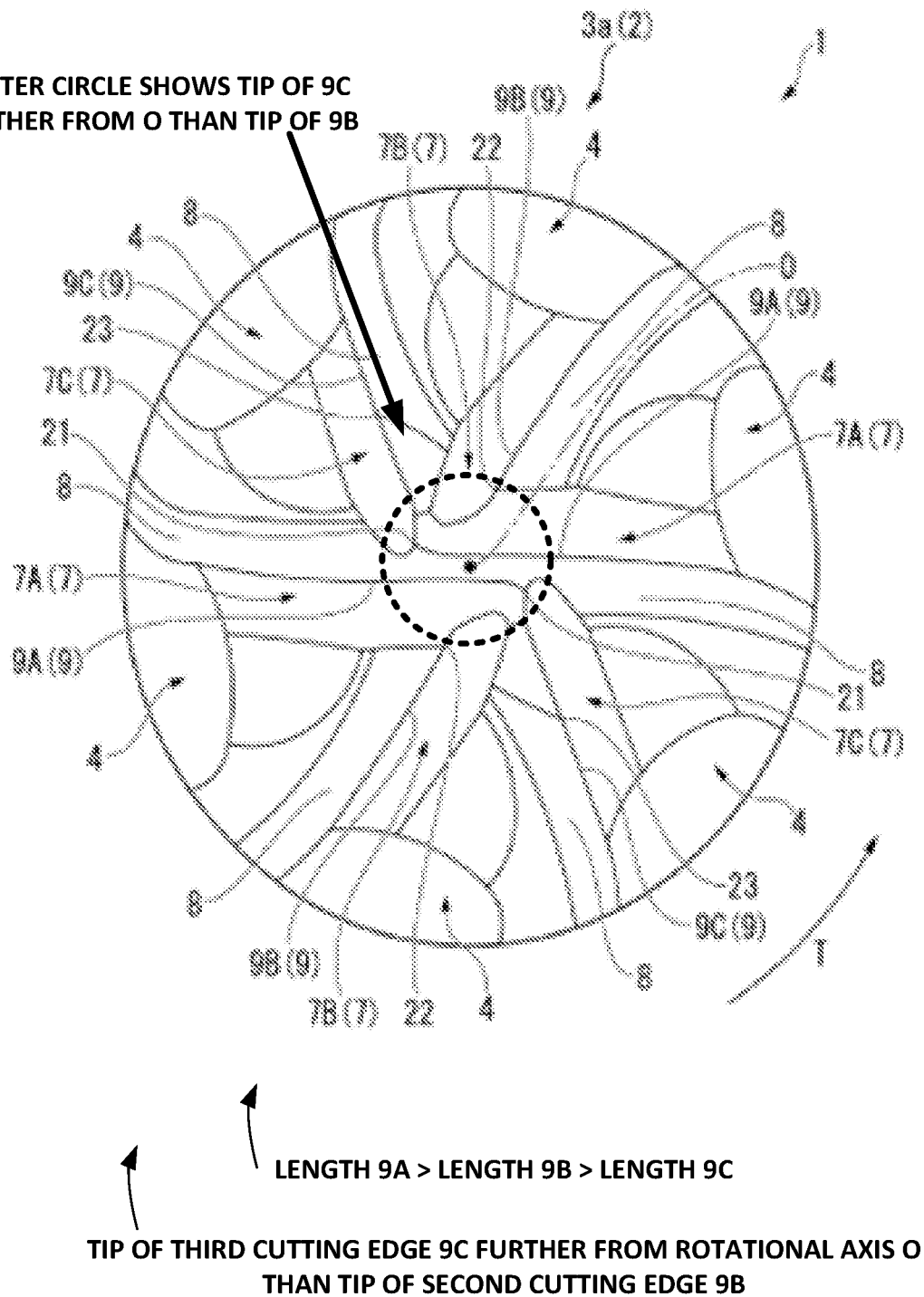
FIG. 3 is a front view of the ball end mill of FIG. 1.

As shown in FIGS. 1 to 3, a ball end mill 1 of the present embodiment is formed in a shaft shape, and for example, has an end mill body 2 formed of cemented alloy, high-speed tool steel, or the like.

The end mill body 2 is formed in an approximately columnar shape. A cutting portion 3a is formed on at least a tip portion along an axis O direction of the end mill body 2. In the end mill body 2, a portion other than the cutting portion 3a becomes a shank portion 3b.

In the ball end mill 1, the columnar shank portion 3b of the end mill body 2 is attached to a spindle of a machine tool such as a machining center, and the ball end mill 1 is rotated around the axis O in an end mill rotation direction T by the spindle. The ball end mill 1 performs cutting in the axis O direction or a radial feeding orthogonal to the axis O along with the rotation, and cuts into the workpiece so as to cut the workpiece.

For example, the ball end mill 1 performs various kinds of machining such as curved surface machining, pocketing machining, deep drilling, R machining (convex R, concave R), chamfering machining, or hole machining on the workpiece.

Specifically, for example, the ball end mill 1 of the present embodiment is detachably mounted on a spindle of a machining center or the like which controls multi-axes of four to six axes and is used to cut the workpiece.

When the workpiece is cut by the ball end mill 1, a coolant is supplied to the cutting portion 3a of the ball end mill 1 and a cutting surface (portion to be machined) of the workpiece. For example, as the coolant, an oil-based or water-soluble cutting fluid, compressed air, or the like is used. For example, the coolant may be supplied to the cutting portion 3a and the machining surface through an inside of the end mill body 2 from the spindle of the machine tool or may be supplied to the cutting portion 3a and the machining surface from an outside of the end mill body 2.

In the present embodiment, a direction (that is, a direction in which the axis O extends) along the axis O of the end mill body 2 is referred to as the axis O direction. In addition, in the axis O direction, a direction from the shank portion 3b toward the cutting portion 3a is referred to as a tip side, and a direction from the cutting portion 3a toward the shank portion 3b is referred to as a posterior end side.

In addition, a direction orthogonal to the axis O is referred to as a radial direction. In the radial direction, a direction approaching the axis O is referred to as an inside in the radial direction and a direction separated from the axis O is referred to as an outside in the radial direction.

In addition, a direction around the axis O is referred to as a circumferential direction. In the circumferential direction, a direction in which the end mill body 2 is rotated by the spindle of the machine tool at the time of cutting is referred to as the end mill rotation direction T, and a rotation direction opposite to the end mill rotation direction T is referred to as a side (that is, a counter-end mill rotation direction) opposite to the end mill rotation direction T.

In the present embodiment, the web thickness of the cutting portion 3a of the end mill body 2 is 60% or more, preferably 65% or more, of an outer diameter (cutting edge diameter) of the cutting portion 3a. In addition, the length (cutting edge length) of the cutting portion 3a along the axis O direction is 1.5 times or less the cutting edge diameter, preferably, 1.0 time or less the cutting edge diameter.

A plurality of chip discharge grooves 4 are formed on an outer periphery of the cutting portion 3a at intervals in the circumferential direction. In the present embodiment, the chip discharge grooves 4 are disposed at equal intervals in the circumferential direction. Moreover, in the example of the present embodiment, six chip discharge grooves 4 are formed on the outer periphery of the cutting portion 3a.

The chip discharge grooves 4 extend in the circumferential direction from the tip side of the end mill body 2 toward the posterior end side in the axis O direction. In the present embodiment, each chip discharge groove 4 is open to a tip surface (that is, a convex hemispherical surface of the cutting portion 3a facing the tip side in the axis O direction) of the end mill body 2 and is gradually twisted toward the opposite side to the end mill rotation direction T from the tip surface toward the posterior end side of the end mill body 2 so as to extend spirally.

Each chip discharge groove 4 is cut up to the outer periphery of the end mill body 2 at an end portion on the posterior end side of the cutting portion 3a. In other words, in the end mill body 2, a region in which the chip discharge grooves 4 are formed along the axis O direction becomes the cutting portion 3a.

Each chip discharge groove 4 has a wall surface facing the end mill rotation direction T. In the wall surface, a portion adjacent to the cutting edge becomes a rake surface.

Specifically, in the rake surface of the cutting edge, a portion adjacent to a peripheral cutting edge 5 described later of the cutting edge becomes a rake surface 11 of the peripheral cutting edge 5, and a portion adjacent to an end cutting edge 9 described later of the cutting edge becomes a rake surface 12 of the end cutting edge 9. The rake surface 12 of the end cutting edge 9 is formed in the gash 7 of the chip discharge groove 4.

The groove-shaped gash 7 is formed on a tip portion of each chip discharge groove 4 in the axis O direction.

As shown in FIG. 3, in a front view of the end mill body 2 when the end mill body 2 is viewed from the tip toward the posterior end side in the axis O direction, each gash 7 extends along the radial direction. A radially inner end portion of the gash 7 is disposed near the axis O, and the gash 7 gradually extends toward the posterior end side in the axis O direction radially outward from the radially inner end portion.

The number of gashes 7 corresponds to the number of chip discharge grooves 4, and in the example of the present embodiment, six gashes 7 are formed. The gashes 7 include a plurality of types of gashes 7A to 7C according to types of the end cutting edges 9 described later (that is, a first end cutting edge 9A, a second end cutting edge 9B, and a third end cutting edge 9C). The gashes 7A to 7C will be separately described later.

As shown in FIGS. 1 to 3, the plurality of cutting edges are formed on the cutting portion 3a at intervals in the circumferential direction. Each of the cutting edges has the peripheral cutting edge 5 and the end cutting edge 9. The peripheral cutting edge 5 and the end cutting edge 9 are connected to each other, and thus, the cutting edge is formed in an approximately J shape as a whole.

The number of cutting edges corresponds to the number of chip discharge grooves 4, and in the example of the present embodiment, six (six sets of) cutting edges are provided. That is, the ball end mill 1 of the present embodiment is a ball end mill having six cutting edges.

In the cutting edge, the end cutting edge (that is, tip cutting edge, ball cutting edge) 9 is formed on a crossing ridgeline between a wall surface of the gash 7 which is positioned on the tip portion of the chip discharge groove 4 and faces the end mill rotation direction T of the gash 7 and a tip surface of the end mill body 2.

The end cutting edge 9 extends along a tip outer-peripheral edge of the wall surface of the gash 7 and is formed in an arc shape protruding toward a tip outer-peripheral side of the end mill body 2. The end cutting edge 9 extends toward the posterior end side of the end mill body 2 and toward the opposite side to the end mill rotation direction T radially inward from the tip (radially inner end) of the end cutting edge 9.

The end cutting edge 9 is formed on a crossing ridgeline between the rake surface 12 positioned on a tip outer-peripheral-side end portion of the wall surface of the gash 7 facing the end mill rotation direction T and a tip flank face 8 of the tip surface of the cutting portion 3a adjacent to the opposite side to the end mill rotation direction T of the gash 7.

In the tip surface of the cutting portion 3a, the tip flank face 8 is formed between the gashes 7 (chip discharge grooves 4) adjacent to each other in the circumferential direction. The tip flank face 8 is inclined toward a posterior inner-peripheral side from the end cutting edge 9 toward the opposite side to the end mill rotation direction T. Accordingly, the clearance angle is given to the end cutting edge 9. In the present embodiment, the clearance angle of the end cutting edge 9 is 5° to 15°.

The plurality of (six in the example of the present embodiment) end cutting edges 9 are disposed at intervals around the axis O on the tip portion of the end mill body 2 in the axis O direction, and each cutting edge is formed in a convex arc shape. In addition, the plurality of end cutting edges 9 are formed such that a rotational locus around the axis O forms (draws) a hemispherical shape having a center on the axis O.

The plurality of end cutting edges 9 include a plurality of types of end cutting edges having different cutting edge lengths, and specifically, includes three types of end cutting edges of the first end cutting edge 9A, the second end cutting edge 9B, and the third end cutting edge 9C.

In the end cutting edges 9A to 9C, the first end cutting edge 9A has a radially inward cutting edge length longest among the plurality of end cutting edges 9.

In the front view of the end mill body 2 shown in FIG. 3, the first end cutting edge 9A extends radially inward from a connection portion (that is, a radially outer end edge of the first end cutting edge 9A) between the peripheral cutting edge 5 and the first end cutting edge 9A, and a tip 21 in a cutting edge length direction of the first end cutting edge 9A is disposed at a position beyond the axis O.

That is, in the first end cutting edge 9A, the tip 21 in the cutting edge length direction extending radially inward reaches the axis O and extends to a destination of the first end cutting edge 9A beyond the axis O. In addition, in the present embodiment, the first end cutting edge 9A does not pass immediately above the axis O.

The second end cutting edge 9B is adjacent to the first end cutting edge 9A in the end mill rotation direction T and has a radially inward cutting edge length shorter than that of the first end cutting edge 9A.

In the front view of the end mill body 2 shown in FIG. 3, the second end cutting edge 9B extends from a connection portion (that is, a radially outer end edge of the second end cutting edge 9B) between the peripheral cutting edge 5 and the second end cutting edge 9B toward the inside in the radial direction, and a tip 22 in a cutting edge length direction of the second end cutting edge 9B is disposed at a position which does not exceed the axis O.

That is, in the second end cutting edge 9B, the tip 22 in the cutting edge length direction extending radially inward does not reach the axis O.

The third end cutting edge 9C is adjacent to the second end cutting edge 9B in the end mill rotation direction T and has a radially inward cutting edge length shorter than that of the second end cutting edge 9B.

In the front view of the end mill body 2 shown in FIG. 3, the third end cutting edge 9C extends from a connection portion (that is, a radially outer end edge of the third end cutting edge 9C) between the peripheral cutting edge 5 and the third end cutting edge 9C toward the inside in the radial direction, and a tip 23 in a cutting edge length direction of the third end cutting edge 9C is disposed at a position which does not exceed the axis O.

That is, in the third end cutting edge 9C, the tip 23 in the cutting edge length direction extending radially inward does not reach the axis O. Moreover, the tip 23 of the third end cutting edge 9C is disposed radially outside the tip 22 of the second end cutting edge 9B (that is, a distance from the axis O is larger).

It is preferable that a linear distance of the tip 22 of the second end cutting edge 9B from the axis O is set to a range of 0.05d to 0.15d of a tool diameter d. In addition, the tool diameter d indicates an outer diameter (cutting edge diameter) of the cutting portion 3a. If the linear distance is less than 0.05d, it is difficult to form the gash 7A of the first end cutting edge 9A. Moreover, if the linear distance is larger than 0.15d, cutting performance decreases.

It is preferable that a linear distance of the tip 23 of the third end cutting edge 9C from the axis O is set to a range of 0.15d to 0.3d of a tool diameter d. If the linear distance is less than 0.15d, a difference between the cutting edge length of the third end cutting edge 9C and the cutting edge length of the second end cutting edge 9B is too small, and vibrations easily occur. Moreover, if the linear distance is larger than 0.3d, the cutting performance decreases.

In the present embodiment, two sets of the first end cutting edges 9A, the second end cutting edges 9B, and the third end cutting edges 9C are provided in 180° rotational symmetry centered on the axis O.

Figure 4:
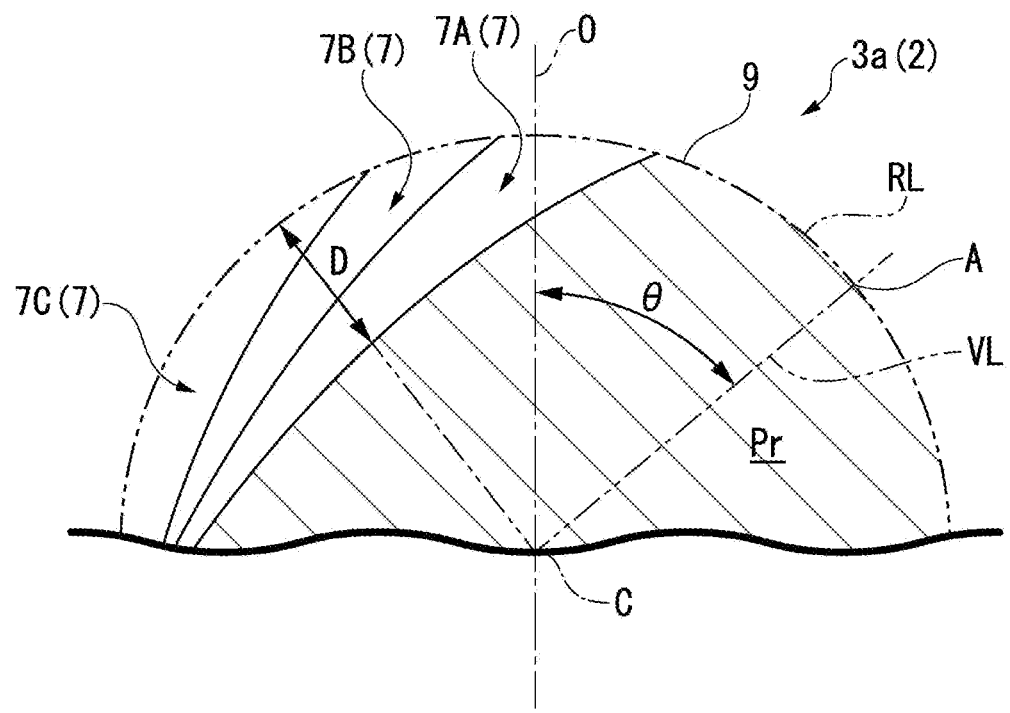
FIG. 4 is a schematic view showing a gash depth and a radiation angle of the ball end mill of FIG. 1.

FIG. 4 is a longitudinal sectional view of the ball end mill 1 including the axis O and shows the cutting portion 3a in a simplified manner. In FIG. 4, the end cutting edge 9 extends along an imaginary hemispherical surface RL having a center point C on the axis O.

Here, an imaginary plane including a predetermined point A on the end cutting edge 9 and the axis O is defined as a reference plane Pr. The reference plane Pr is a plane which is perpendicular to the end mill rotation direction T (that, main movement direction). In addition, in the reference plane Pr, an angle at which an imaginary straight line VL passing through the center point C and the predetermined point A is inclined with respect to the axis O is defined as a radiation angle θ. Accordingly, the radiation angle θ becomes 0 in a case where the predetermined point A is disposed on the axis O and becomes 90° in a case where the predetermined point A is disposed at the same position as the center point C in the axis O direction.

In the present embodiment, in the predetermined radiation angle θ, among rotational loci around the axis O of the first end cutting edge 9A, the second end cutting edge 9B, and the third end cutting edge 9C, a distance along in a radiation direction between a rotational locus (not shown) positioned on an outermost side and a rotational locus (not shown) positioned on an innermost side in the radiation direction (a direction in which the imaginary straight line VL extends in FIG. 4) centered on the center point C is 5 µm or less. Preferably, the distance is 3 µm or less. That is, a difference between a maximum value and a minimum value of R accuracy of the end cutting edge 9 at the predetermined radiation angle θ is 5 µm or less, preferably 3 µm or less.

In addition, it is preferable that the predetermined angle θ is 40° to 50°.

In addition, the imaginary hemispherical surface RL shown in FIG. 4 shows a hemispherical rotational locus which is formed (drawn) by the entire end cutting edge 9 including the first end cutting edge 9A, the second end cutting edge 9B, and the third end cutting edge 9C rotating around the axis O. Accordingly, the imaginary hemispheric surface RL includes the rotational locus of the first end cutting edge 9A around the axis O, the rotational locus of the second end cutting edge 9B around the axis O, and the rotational locus of the third end cutting edge 9C around the axis O, and the rotational locus obtained by averaging the respective trajectories is shown as the imaginary hemispherical surface RL.

Actually, as described above, the rotational locus of the first end cutting edge 9A around the axis O, the rotational locus of the second end cutting edge 9B around the axis O, and the rotational locus of the third end cutting edge 9C around the axis O are slightly deviated in the radiation direction centered on the center point C. The above-described description is about this deviation.

In addition, although not particularly shown, in an imaginary plane which is perpendicular to the reference plane Pr and includes the imaginary straight line VL, a true rake angle at which the rake surface 12 of the end cutting edge 9 is inclined with respect to the reference plane Pr is defined as a radial rake angle.

In the present embodiment, the radial rake angle of the end cutting edge 9 is 0° to 5°. Moreover, the radial rake angle of the end cutting edge 9 increases from the tip (in the vicinity of radiation angle θ=0°) of the end cutting edge 9 to a radial outer edge (in the vicinity of radiation angle θ=90°) connected to the peripheral cutting edge 5.

In FIG. 3, in the tip portion of the end mill body 2, the gashes 7 are respectively disposed to be adjacent to the plurality of end cutting edges 9 in the end mill rotation direction T. The plurality of gashes 7 include a plurality of types of gashes having different lengths (groove lengths) from each other. Specifically, the plurality of gashes 7 includes three types of gashes such as the gash 7A of the first end cutting edge 9A, the gash 7B of the second end cutting edge 9B, and the gash 7C of the third end cutting edge 9C.

In the present embodiment, two sets of the gashes 7A of the first end cutting edges 9A, the gashes 7B of the second end cutting edges 9B, and the gashes 7C of the third end cutting edges 9C are provided in 180° rotational symmetry centered on the axis O.

In the front view of the end mill body 2 shown in FIG. 3, a length of the gash 7B of the second end cutting edge 9B is shorter than a length of the gash 7A of the first end cutting edge 9A, and a length of the gash 7C of the third end cutting edge 9C is shorter than the length of the gash 7B of the second end cutting edge 9B.

In addition, the gash 7A of the first end cutting edge 9A, the gash 7B of the second end cutting edge 9B, and the gash 7C of the third end cutting edge 9C communicate with each other.

In the example of the present embodiment, a tip of the gash 7A of the first end cutting edge 9A and a tip of the gash 7C of the third end cutting edge 9C are connected to each other. In addition, in a gash 7A of the first end cutting edge 9A, the tip of the gash 7B of the second end cutting edge 9B is connected to a portion separated toward the posterior end side of the end mill body 2 from the tip connected to the gash 7C of the third end cutting edge 9C.

That is, the gashes 7B and 7C communicate with the gash 7A and the gashes 7B and 7C with each other through the gash 7A.

Here, FIG. 4 is a schematic view in which the gashes 7A to 7C are shown on the same imaginary plane (a longitudinal cross section of the end mill body 2 including the axis O) in order to easily compare the gashes 7A to 7C with each other.

As shown in FIG. 4, a depth of the gash 7B of the second end cutting edge 9B is deeper than that of the gash 7C of the third end cutting edge 9C, and a depth of the gash 7A of the first end cutting edge 9A is deeper than that of the gash 7B of the second end cutting edge 9B.

Moreover, the "depth of the gash 7" indicates a distance between the hemispheric rotational locus (imaginary hemispherical surface RL) obtained by rotating the end cutting edge 9 around the axis O and a portion (a deepest portion of the gash 7) of a bottom surface of the gash 7 positioned farthest from the rotational locus (the imaginary hemispheric surface RL).

That is, for the imaginary hemispheric surface RL, the "depth of the gash" is a distance along the radiation direction between a portion of the bottom surface of the gash 7 positioned on an innermost side in the radiation direction centered on the center point C and the imaginary hemispherical surface RL.

Specifically, in FIG. 4, the reference sign RL indicates the rotational locus (imaginary hemispherical surface) obtained by rotating the end cutting edge 9 around the axis O, and a distance indicated by a reference sign D is the gash depth (the depth of the gash 7A in the shown example) from the rotational locus (imaginary hemispherical surface RL) of the end cutting edge 9 to the deepest portion of the gash 7.

As shown in FIGS. 1 and 2, in the cutting edge, the peripheral cutting edge 5 is formed on a crossing ridgeline between a wall surface facing the end mill rotation direction T of a portion (a portion positioned on the posterior end side of the end mill body 2 from the gash 7) except for the gash 7 of the chip discharge groove 4 and the outer peripheral surface of the end mill body 2.

The peripheral cutting edge 5 is connected to a radially outer end edge (this end edge is an end edge on the posterior end side of the end cutting edge 9) of the end cutting edge 9 and extends from the end edge toward the posterior end side (that is, the posterior end side of the end mill body 2) in the axis O direction. Specifically, the peripheral cutting edge 5 extends toward the opposite side to the end mill rotation direction T from the tip of the peripheral cutting edge 5 connected to the end cutting edge 9 toward the posterior end side.

In the present embodiment, a twist angel of the peripheral cutting edge 5 is 15° to 30°.

The peripheral cutting edge 5 is formed on a crossing ridgeline between the rake surface 11 positioned on a radially outer end portion of the wall surface facing the end mill rotation direction T in the portion except for the gash 7 of the chip discharge groove 4 and a peripheral flank face 6 of the outer peripheral surface of the cutting portion 3a adjacent to the opposite side to the end mill rotation direction T of the chip discharge groove 4. In the present embodiment, a rake angle of the peripheral cutting edge 5 is −10° to 0°.

The peripheral flank face 6 is formed between the chip discharge grooves 4 adjacent to each other in the circumferential direction on the outer peripheral surface of the cutting portion 3a.

The peripheral flank face 6 is inclined radially inward from the peripheral cutting edge 5 toward the opposite side to the end mill rotation direction T. Accordingly, a clearance angle is given to the peripheral cutting edge 5. In the present embodiment, the clearance angle of the peripheral cutting edge 5 is 5° to 15°.

The plurality of (six in the example of the present embodiment) peripheral cutting edges 5 are disposed at intervals around the axis O on the outer periphery of the end mill body 2 and extend in approximately parallel with each other. A circumferential position of each peripheral cutting edge 5 is connected to a radial outer end edge of each corresponding end cutting edge 9. In the present embodiment, the plurality of peripheral cutting edges 5 are disposed at equal pitches around the axis O. The rotational locus obtained by rotating the plurality of peripheral cutting edges 5 around the axis O is a columnar shape centered on the axis O.

(Operation and Effect of Ball End Mill)

The ball end mill 1 of the above-described present embodiment includes the first end cutting edges 9A, the second end cutting edges 9B, and the third end cutting edges 9C as the plurality of end cutting edges 9 whose rotational loci around the axis O form a hemispherical shape.

The cutting edge lengths of the first end cutting edge 9A, the second end cutting edge 9B, and the third end cutting edge 9C toward the inside in the radial direction are shortened in this order. That is, in the first to third end cutting edges 9A to 9C, the cutting edge length of the first end cutting edge 9A is longest and the cutting edge length of the third end cutting edge 9C is shortest. The cutting edge length of the first end cutting edge 9A is longest, the cutting edge length of the third end cutting edge 9C is shortest, and thus, the gash 7 can be also formed near a center portion (near the axis O) of an end mill tip surface, and it is possible to enhance chip discharging properties. In addition, amounts of cutting of the respective end cutting edges 9A to 9C are different from each other, and thus, chatter vibrations during the cutting tend to be suppressed.

In addition, in the end cutting edges 9A to 9C, the gashes 7A to 7C are respectively disposed to be adjacent to the end cutting edges 9A to 9C in the end mill rotation direction T.

The radially inward gash lengths of the gashes 7A to 7C correspond to the cutting edge lengths of the end cutting edges 9A to 9C adjacent to the gashes 7A to 7C. Accordingly, the gash lengths of the gash 7A of the first end cutting edge 9A, the gash 7B of the second end cutting edge 9B, and the gash 7C of the third end cutting edge 9C are shortened in this order. That is, in the gashes 7A to 7C of the first to third end cutting edges 9A to 9C, the length of the gash 7A of the first end cutting edge 9A is longest and the length of the gash 7C of the third end cutting edge 9C is shortest.

In addition, as the cutting edge length of the end cutting edge 9 becomes longer, the amount of cutting per one cut (unit cut) increases, and thus, it is more difficult to secure the chip discharging properties. That is, it is more difficult to secure the chip discharging properties as the length of the gash 7 becomes longer.

Accordingly, the present embodiment adopts a specific configuration in which the depth of the gash 7B of the second end cutting edge 9B is deeper than that of the gash 7C of the third end cutting edge 9C, and the depth of the gash 7A of the first end cutting edge 9A is deeper than that of the gash 7B of the second end cutting edge 9B.

That is, the gash 7C of the third end cutting edge 9C, the gash 7B of the second end cutting edge 9B, and the gash 7A of the first end cutting edge 9A are made deeper in this order. Accordingly, in the first to third end cutting edges 9A to 9C, the volume (cross-sectional area) of the gash 7 increases as the cutting edge length becomes longer. In other words, as the amount of cutting of the end cutting edge 9 increases, the secured gash volume can increase. In addition, it is possible to stably enhance the chip discharging properties.

As described above, according to the ball end mill 1 of the present embodiment, it is possible to enhance the chip discharging properties of the gash 7, and it is possible to prevent chip clogging to improve machining surface accuracy.

Moreover, in the present embodiment, two sets of the first end cutting edges 9A, the second end cutting edges 9B, and the third end cutting edges 9C are provided in 180° rotational symmetry centered on the axis O, and the following effects are exerted.

That is, in this case, the ball end mill 1 having six end cutting edges 9 is realized, and it is possible to enhance machining efficiency of the cutting. In addition, in the ball end mill 1 having multiple cutting edges, according to the present embodiment, the chip discharging properties are stably secured.

In addition, in the present embodiment, the gash 7A of the first end cutting edge 9A, the gash 7B of the second end cutting edge 9B, and the gash 7C of the third end cutting edge 9C communicate with each other, and thus, the above-described effects of stably enhancing the chip discharging properties are more remarkable.

Moreover, in the present embodiment, in the front view of the end mill body 2 shown in FIG. 3, the first end cutting edge 9A extends radially inward from the connection portion (that is, a radially outer end edge of the first end cutting edge 9A) between the peripheral cutting edge 5 and the first end cutting edge 9A, and the tip 21 in the cutting edge length direction of the first end cutting edge 9A is disposed at the position beyond the axis O. Accordingly, it is possible to cut the workpiece by the first end cutting edge 9A even at the most tip position (that is, on the axis O) of the end mill body 2 in the axis O direction. Therefore, it is possible to easily cope with various types or shapes of cutting while enhancing the machining surface accuracy.

In addition, in the present embodiment, the plurality of peripheral cutting edges 5 formed at intervals in the circumferential direction are disposed on the outer periphery of the end mill body 2 at equal pitches around the axis O. Therefore, when the ball end mill 1 is manufactured, the peripheral cutting edges 5 are easily formed, and easiness of manufacturing is enhanced.

Moreover, in the present embodiment, in the predetermined radiation angle θ, among rotational loci around the axis O of the first end cutting edge 9A, the second end cutting edge 9B, and the third end cutting edge 9C, the distance (that is, the difference between the maximum value and the minimum value of the R accuracy) along in the radiation direction between the rotational locus positioned on the outermost side in the radiation direction centered on the center point C and the rotational locus positioned on the innermost side in the radiation direction is 5 μm or less, preferably, 3 μm.

If deflection accuracy of the end cutting edges 9A to 9C is not sufficient, in a case where a single-edge feed amount is small, each of the end cutting edges 9A to 9C does not sufficiently function, and thus, the machining surface accuracy tends to decrease.

Therefore, in order to achieve more favorable machining surface accuracy, it is preferable that the difference (that is, a deflection of the end cutting edges 9A to 9C) between the maximum value and the minimum value of the R accuracy of each of the end cutting edges 9A to 9C at the predetermined radiation angle θ is 5 μm or less. By controlling the deflection of the end cutting edges 9A to 9C to 5 μm or less, even when the single-edge feed amount is small, each of the end cutting edges 9A to 9C can exert the same function, and thus, it is possible to achieve favorable machining surface accuracy.

In order to make the above-described effect more remarkable, it is preferable that the difference (that is, a deflection of the end cutting edges 9A to 9C) between the maximum value and the minimum value of the R accuracy of each of the end cutting edges 9A to 9C at the predetermined radiation angle θ is 3 μm or less. By controlling the deflection of the end cutting edges 9A to 9C to 3 μm or less, even when the single-edge feed amount decreases, each of the end cutting edges 9A to 9C can function, and thus, it is possible to prevent a feeding speed from being too fast.

The relationship between the single-edge feed amount and the deflection for functioning each of the end cutting edges 9A to 9C can be simply obtained from a calculation of a theoretical cusp height.

For example, in a ball end mill having a ball radius of 4 mm, when the single-edge feed amount is 0.25 mm/t (tooth), each end cutting edge does not function unless the deflection of the end cutting edge is 8.0 μm or less.

Therefore, as in the present embodiment, in the case where the deflection of the end cutting edge 9 is 5.0 μm or less, even when the single-edge feed amount is set to 0.2 mm/t, each of the end cutting edges 9A to 9C can function, and it is possible to decrease the single-edge feed amount. The single-edge feed amount decreases, and thus, the cutting resistance decreases, and it is possible to accurately perform the machining.

In addition, in a case where the deflection of the end cutting edge 9 is 4.0 μm or less, the single-edge feed amount is 0.17 mm/t or more, each of the end cutting edges 9A to 9C can function, which is favorable. Moreover, in a case where the deflection of the end cutting edge 9 is 3.0 μm or less, the single-edge feed amount is 0.15 mm/t or more, each of the end cutting edges 9A to 9C can function, which is favorable.

In general, in a ball end mill having multiple cutting edges such as six cutting edges, an interference of a grinding wheel easily occurs during the manufacturing, and thus, it is difficult to suppress the deflection of each end cutting edge.

As in the present embodiment, in order to achieve that the deflection of the end cutting edge 9 of the ball end mill having six cutting edges is set to 5 μm or less, 4 μm or less, or 3 μm or less, on a mass-production basis, in the lengths of the end cutting edges 9A to 9C, the first end cutting edge 9A, the second end cutting edge 9B, and the third end cutting edge 9C are shortened in this order so as to suppress the inference of the grinding wheel at the time of manufacturing, and a cutting edge type that the end cutting edges are provided as targets to be centered on the axis O is effective.

In addition, the second end cutting edge 9B and the third end cutting edge 9C are not formed near the tip of the cutting portion 3a, and thus, it is difficult to correctly measure the R accuracy of each of the end cutting edges 9A to 9C.

Accordingly, as described in the present embodiment, preferably, the predetermined radiation angle θ is set to 40° to 50°. That is, the R accuracy of each of the end cutting edges 9A to 9C may be measured at locations of 40° to 50° with respect to the axis O from the tip of the cutting portion 3a. Each of the end cutting edges 9A to 9C in this range tends to be particularly frequently used, and thus, it is possible to further enhance the machining surface accuracy by suppressing the deflection of each of the end cutting edges 9A to 9C.

In addition, in the present embodiment, the radial rake angle of the end cutting edge 9 is set to 0° to 5°.

If the radial rake angle of the end cutting edge 9 is less than 0°, sharpness deteriorates, the cutting resistance increases, the deflection occurs, which affects high-precision machining. In addition, if the radial rake angle of the end cutting edge 9 is larger than 5°, a wedge angle of the end cutting edge 9 decreases, and the cutting edge strength decreases.

In the present embodiment, the radial rake angle of the end cutting edge 9 is set to 0° to 5°, and thus, the above-described inconvenience hardly occurs.

Moreover, in the present embodiment, the radial rake angle of the end cutting edge 9 gradually increases from the tip (near radiation angle θ=0°) of the end cutting edge 9 toward a radial outer edge (near radiation angle θ=90°). According to this end cutting edge 9, rigidities at the tip portion of the end cutting edge 9 increase, sharpness in the vicinity of a connection portion between the peripheral cutting edge 5 and the end cutting edge 9 where a chip pocket (chip discharge groove 4) becomes large increases, and thus, it is possible to improve cutting efficiency.

In addition, in the present embodiment, the clearance angle of the end cutting edge 9 is 5° to 15°.

If the clearance angle of the end cutting edge 9 is less than 5°, the machining surface of the workpiece easily rubs against the tip flank face 8, chips are bitten between the machining surface and the tip flank face 8, and chipping or crack easily occurs. In addition, if the clearance angle of the end cutting edge 9 is more than 15°, the wedge angle of the end cutting edge 9 decreases, and the cutting edge strength decreases.

In the present embodiment, the clearance angle of the end cutting edge 9 is set to 5° to 15°, and thus, the above-described inconvenience hardly occurs.

In addition, in the present embodiment, the rake angle of the peripheral cutting edge 5 is −10° to 0°.

If the rake angle of the peripheral cutting edge 5 is less than −10°, a step easily occurs at a connection portion between the rake surface 12 of the end cutting edge 9 and the rake surface 11 of the peripheral cutting edge 5, a flow of the chip becomes worse, and thus, a failure such as chip clogging easily occurs. In addition, if the rake angle of the peripheral cutting edge 5 is more than 0°, a peripheral cutting edge groove (a groove which is formed when the chip discharge grooves 4 is formed at the time of manufacturing of an end interferes with the rake surface 12 of the end cutting edge 9, rigidities of the end cutting edge 9 are influenced, and thus, chipping easily occurs.

In the present embodiment, the rake angle of the peripheral cutting edge 5 is set to −10° to 0°, and thus, the above-described inconvenience hardly occurs.

In addition, in the present embodiment, the clearance angle of the peripheral cutting edge 5 is 5° to 15°.

If the clearance angle of the peripheral cutting edge 5 is less than 5°, when a standing wall is machined, the machining surface of the workpiece easily rubs against the peripheral flank face 6, chips are bitten between the machining surface and the peripheral flank face 6, and chipping or crack easily occurs. In addition, if the clearance angle of the peripheral cutting edge 5 is more than 15°, the wedge angle of the peripheral cutting edge 5 decreases, the cutting edge strength decreases, and chipping or crack easily occurs. In addition, when the end mill is manufactured, the grinding wheel easily interferes with the tip of the adjacent peripheral cutting edge 5, and thus, it is difficult to manufacture the end mill.

In the present embodiment, the clearance angle of the peripheral cutting edge 5 is set to 5° to 15°, and thus, the above-described inconvenience hardly occurs.

Moreover, in the present embodiment, the twist angle of the peripheral cutting edge 5 is 15° to 30°.

In a case where the twist angle of the peripheral cutting edge 5 is less than 15° or more than 30°, a step easily occurs at a connection portion between the end cutting edge 9 and the peripheral cutting edge 5, and a streak (cutting mark) easily occurs on the machining surface of the workpiece.

In the present embodiment, the twist angle of the peripheral cutting edge 5 is set to 15° to 30°, and thus, the above-described inconvenience hardly occurs.

In addition, in the present embodiment, the web thickness of the cutting portion 3a of the end mill body 2 is 60% or more, preferably 65% or more, of the outer diameter (cutting edge diameter) of the cutting portion 3a. In addition, the length (cutting edge length) of the cutting portion 3a along the axis O direction is 1.5 times or less the cutting edge diameter, preferably, 1.0 time or less the cutting edge diameter.

In order to further improve the machining surface accuracy by the ball end mill 1, it is preferable to further increase rigidities of the tool. In order to increase the rigidities of the tool, it is effective to set the web thickness to 60% or more, more preferably, 65% or more. Moreover, it is effective to set the cutting edge length of the cutting portion 3a to 1.5 times or less the cutting edge diameter, more preferably, 1.0 time or less the cutting edge diameter.

For example, even when the ball end mill 1 of the present embodiment is used at high speed feeding, it is possible to achieve an excellent machining surface free from blisters. In addition, it is preferable to use this ball end mill 1 in 5-axis machining. Moreover, it is preferable that the ball end mill 1 of the present embodiment is used at a feeding speed of 10,000 mm/min or more, and it is more preferable that the ball end mill 1 is used at a feeding speed of 15,000 mm/min or more.

Moreover, the present invention is not limited to the above-described embodiment, and various modifications can be made within a scope which does not depart from the spirit of the present invention.

For example, in the above-described embodiment, the plurality of peripheral cutting edges 5 are disposed on the outer periphery of the end mill body 2 at equal pitches (at equal intervals) around the axis O. However, the present invention is not limited to this. That is, the plurality of peripheral cutting edges 5 may be disposed on the outer periphery of the end mill body 2 at unequal pitches (at unequal intervals) around the axis O. In a case where the plurality of peripheral cutting edges 5 are disposed at unequal pitches, resonance (chatter vibrations or the like) is suppressed when the cutting is performed using the peripheral cutting edge 5.

In addition, in the above-described embodiment, the ball end mill 1 having six cutting edges in which six (six sets of) cutting edges are provided in the cutting portion 3a of the end mill body 2 is described. However, the present invention is not limited to this. For example, the ball end mill 1 having three cutting edges in which three (three sets of) cutting edges are provided in the cutting portion 3a of the end mill body 2 may be adopted. In this case, one set of the first end cutting edge 9A, the second end cutting edge 9B, and the third end cutting edge 9C is provided as three end cutting edges 9.

In addition, within a scope which departs from the spirit of the present invention, respective configurations (components) described in the above-described embodiment, the modification example, the note, or the like may be combined with each other, or an addition, an omission, a replacement, and other modification of a configuration can be made. Moreover, this invention is not limited by the above-described embodiment and is limited only by the claims.

INDUSTRIAL APPLICABILITY

In a ball end mill of the present invention, it is possible to stably enhance chip discharging properties of a gash, and it is possible to improve machining surface accuracy. Accordingly, the present invention has industrial applicability.

REFERENCE SIGNS LIST

1: ball end mill
2: end mill body
5: peripheral cutting edge
7: gash
7A: gash of first end cutting edge
7B: gash of second end cutting edge
7C: gash of third end cutting edge
9: end cutting edge (tip cutting edge, ball end cutting edge)
9A: first end cutting edge
9B: second end cutting edge
9C: third end cutting edge
21: tip in cutting edge length direction of first end cutting edge
A: predetermined point on end cutting edge
C: center point
D: depth of gash
O: axis
Pr: reference plane
RL: imaginary hemispherical surface (rotational locus of end cutting edge)
T: end mill rotation direction
VL: imaginary straight line
θ: radiation angle

What is claimed is:

1. A ball end mill comprising:
an end mill body which is formed in a shaft shape;
a plurality of convex arcuate end cutting edges which are disposed on a tip portion of the end mill body at intervals around a rotational axis and form a hemispherical shape such that a hemispherical rotational locus around the axis has a center on the axis; and
a plurality of peripheral cutting edges which are disposed on an outer periphery of the end mill body at intervals around the axis, the plurality of peripheral cutting edges are respectively connected to radially outer ends of the plurality of end cutting edges, and the plurality of peripheral cutting edges extend from the plurality of end cutting edges toward a posterior end side of the end mill body,
wherein the plurality of end cutting edges includes:
a first end cutting edge having a first cutting edge length, the first cutting edge length is longest among the plurality of end cutting edges,
a second end cutting edge which is directly adjacent to the first end cutting edge in an end mill rotation direction, the second end cutting edge having a second cutting edge length that is shorter than the first cutting edge length, and a third end cutting edge which is directly adjacent to the second end cutting edge in the end mill rotation direction, the third end cutting edge having a third cutting edge length that is shorter than that of the second end cutting edge, wherein each length is a distance, measured orthogonal to axis in a front view of the end millbody, between respective radially outer ends of the plurality of end cutting edges and respective radially inner end tips of the plurality of end cutting edges, wherein, in the front view of the end mill body, the first end cutting edge extends from the first end cutting edge radially outer end beyond the axis to the first end cutting edge radially inner end tip, the second end cutting edge extends from the second end cutting edge radially outer end to a point not beyond the axis to the second end cutting edge radially inner end tip, the third end cutting edge extends from the third end cutting edge radially outer end to an additional point not beyond the axis to the third end cutting edge radially inner end tip, a plurality of gashes, wherein the plurality of gashes includes a first gash of the first end cutting edge, a second gash of the second end cutting edge and a third gash of the third end cutting edge, wherein a depth of the second gash of the second end cutting edge is deeper than that of the third gash of the third end cutting edge, a depth of the first gash of the first end cutting edge is deeper than the depth of the second gash of the second end cutting edge, each depth being a distance between a hemispheric rotational locus and a bottom surface of the gash positioned farthest from the rotational locus, the tip of the third end cutting edge is further radially outward from the axis than the tip of the second end cutting edge, wherein each of the second gash of the second end cutting edge and the third gash of the third end cutting edge directly intersect with the first gash of the first end cutting edge, wherein the second gash of the second end cutting edge and the third gash of the third end cutting edge intersect with each other via only the first gash of the first end cutting edge, and wherein two sets of each of the first end cutting edges, the second end cutting edges, and the third end cutting edges are provided in 180° rotational symmetry about the axis.

2. The ball end mill according to claim 1, further comprising:

wherein the plurality of peripheral cutting edges are disposed at equal pitches around the axis.

3. The ball end mill according to claim 1, wherein the plurality of end cutting edges is only the two sets.

4. The ball end mill according to claim 3, wherein the plurality of peripheral cutting edges are disposed at equal pitches around the axis.

\* \* \* \* \*